US009772710B2

(12) United States Patent
Liu et al.

(10) Patent No.: US 9,772,710 B2
(45) Date of Patent: Sep. 26, 2017

(54) ARRAY SUBSTRATE AND MANUFACTURING METHOD THEREOF, TOUCH SCREEN AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Hongjuan Liu, Beijing (CN); Xue Dong, Beijing (CN); Haisheng Wang, Beijing (CN); Shengji Yang, Beijing (CN); Lei Wang, Beijing (CN); Chunlei Wang, Beijing (CN); Yingming Liu, Beijing (CN); Tao Ren, Beijing (CN); Weijie Zhao, Beijing (CN); Xiaoliang Ding, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 326 days.

(21) Appl. No.: 14/388,971

(22) PCT Filed: Oct. 23, 2013

(86) PCT No.: PCT/CN2013/085797
§ 371 (c)(1),
(2) Date: Sep. 29, 2014

(87) PCT Pub. No.: WO2015/010376
PCT Pub. Date: Jan. 29, 2015

(65) Prior Publication Data
US 2016/0246425 A1    Aug. 25, 2016

(30) Foreign Application Priority Data

Jul. 22, 2013    (CN) .......................... 2013 1 0308589

(51) Int. Cl.
*G06F 3/045*    (2006.01)
*G06F 3/041*    (2006.01)
(Continued)

(52) U.S. Cl.
CPC ...... *G06F 3/0416* (2013.01); *G02F 1/136286* (2013.01); *G06F 3/044* (2013.01);
(Continued)

(58) Field of Classification Search
CPC ...... G06F 3/044; G06F 3/0416; G06F 3/0412; G06F 2203/04111; G06F 2203/04103; G02F 1/136286
See application file for complete search history.

(56) References Cited

U.S. PATENT DOCUMENTS

2008/0164076 A1* 7/2008 Orsley ................ G06F 3/03543
178/18.01
2011/0310036 A1* 12/2011 Juan ...................... G06F 3/0412
345/173
(Continued)

FOREIGN PATENT DOCUMENTS

CN    102841718 A    12/2012
CN    102945106 A    2/2013
(Continued)

OTHER PUBLICATIONS

Machine translation of foreign application CN103149748A for 20140204288.*
(Continued)

*Primary Examiner* — Michael Pervan
*Assistant Examiner* — Andrew Lee
(74) *Attorney, Agent, or Firm* — Haug Partners LLP

(57) ABSTRACT

The present invention provides an array substrate and a manufacturing method thereof, a touch screen and a display apparatus. The array substrate comprises: a substrate base; and gate lines, data lines and a common electrode layer formed on the substrate base, wherein the gate lines and the data lines define pixel units, and the common electrode layer comprises touch scan electrodes and touch sense electrodes,
(Continued)

and wherein common electrode signals are loaded on the touch scan electrodes during a display period and touch scan signals are loaded on the touch scan electrodes during a touch period, and common electrode signals are loaded on the touch sense electrodes during the display period and the touch sense electrodes output touch sense signals during the touch period. In the present invention, as the touch scan electrodes and the touch sense electrodes are formed in the common electrode layer, there is no need to add a new film layer or add new process steps in the manufacturing process, thereby the manufacturing cost is reduced and the production efficiency is improved.

14 Claims, 4 Drawing Sheets

(51) Int. Cl.
G06F 3/044 (2006.01)
G02F 1/1362 (2006.01)
(52) U.S. Cl.
CPC .. *G06F 3/0412* (2013.01); *G06F 2203/04103* (2013.01); *G06F 2203/04111* (2013.01)

(56) References Cited

U.S. PATENT DOCUMENTS

2012/0274603 A1* 11/2012 Kim ................ G06F 3/0412
345/174
2014/0204288 A1* 7/2014 Mo ................ G02F 1/13338
349/12

FOREIGN PATENT DOCUMENTS

| CN | 103164076 A | 6/2013 |
|---|---|---|
| CN | 202976049 U | 6/2013 |
| CN | 103207720 A | 7/2013 |
| KR | 10-2012-0078099 A | 7/2012 |

OTHER PUBLICATIONS

First Office Action issued by Chinese Patent Office for priority application 2013103085897 dated Sep. 18, 2015 with English translation.
International Search Report and Written Opinion issued by Chinese Patent Office, acting as the ISA, for international application PCT/CN2013/085797 dated Apr. 30, 2014 with English translation of Written Opinion.

* cited by examiner

Forming gate lines and data lines on an array substrate, wherein the gate lines and the data lines define pixel units Forming a common electrode layer on the array substrate, wherein the common electrode layer comprises touch scan electrodes and touch sense electrodes

ARRAY SUBSTRATE AND MANUFACTURING METHOD THEREOF, TOUCH SCREEN AND DISPLAY APPARATUS This application is a 371 of PCT/CN2013/085797 filed on Oct. 23, 2013, which claims priority benefits from Chinese Patent Application Number 201310308589.7 filed Jul. 22, 2013, the disclosure of which is incorporated herein by reference.

TECHNICAL FIELD

The present invention relates to the field of display technology, particularly to an array substrate and a manufacturing method thereof, and a touch screen and a display apparatus.

BACKGROUND ART

As development of display technology, technology of touch screen enters a period of rapid development. According to structures of touch screens, touch screens can be divided into two types: an Add On Cell Touch Screen and an In Cell Touch Screen. Current mainstream touch Screens basically are Add On Cell Touch Screens. An Add On Cell Touch Screen is a liquid crystal display screen with touch function, which is formed by manufacturing a touch panel and a liquid crystal display panel respectively and then joining the touch panel and the liquid crystal display panel together. However, the Add On Cell Touch Screen has defects such as high manufacturing cost, low light transmission rate and massive structure, thus it is difficult to satisfy the consumer's demand on a thinner and lighter touch screen. Particularly, an Add On Cell Touch Screen (which is also referred to Glass to Glass (GTG) Touch Screen) needs to be made by two joins, resulting that the manufacturing cost is significantly increased, the yield of products is greatly reduced, and the thickness of the structure is increased, thereby it is more difficult to meet the consumer's demand on a thinner and lighter touch screen.

As the consumer's demand on a thinner and lighter touch screen increased more and more, an In Cell Touch Screen becomes an important development tendency of touch screen technology. An In Cell Touch Screen is a touch screen whose touch electrodes are embedded in a liquid crystal display panel, thus the thickness of its overall structure is greatly reduced and the manufacturing cost is reduced. Currently, an existing In Cell Touch Screen is formed by directly adding touch scan lines and touch sense lines on the array substrate of the liquid crystal display panel, wherein the touch scan lines and the touch sense lines are in different planes and induction capacitances are formed at the intersections of the touch scan lines and the touch sense lines. Touch scan signals are loaded on the touch scan lines, and when one touches the touch screen, a human body electrical field acts on the induction capacitances, thus the values of the induction capacitances are changed, and the voltage signals induced by the touch sense lines are changed, thereby the position of the touch point can be determined according to the voltage signal.

In the current structure of the In Cell Touch Screen, it is necessary to add a new film layer on the array substrate so as to form the touch scan lines and the touch sense lines, resulting that new process steps would be added in the process for fabricating the array substrate, thereby the manufacturing cost is increased and the production efficiency is lowered.

SUMMARY

The present invention provides an array substrate and a manufacturing method thereof, a touch screen and a display apparatus, so that there is no need to add a new film layer on the array substrate and add new process steps in the manufacturing process, thereby the manufacturing cost is reduced and the production efficiency is improved.

In order to achieve the above objective, the present invention provides an array substrate, comprising: a substrate base; and gate lines, data lines and a common electrode layer formed on the substrate base, wherein the gate lines and the data lines define pixel units, and the common electrode layer comprises touch scan electrodes and touch sense electrodes, and wherein common electrode signals are loaded on the touch scan electrodes during a display period and touch scan signals are loaded on the touch scan electrodes during a touch period, and common electrode signals are loaded on the touch sense electrodes during the display period and the touch sense electrodes outputs touch sense signals during the touch period.

Optionally, the array substrate further comprises touch scan signal lines and touch sense signal lines, wherein the touch scan signal lines are respectively connected with the corresponding touch scan electrodes, the touch sense signal lines are respectively connected with the corresponding touch sense electrodes, and the touch scan signal lines and the touch sense signal lines are provided in the same layer with the gate lines.

Optionally, the touch scan signal lines are respectively connected with the touch scan electrodes through a plurality of via holes, and the touch sense signal lines are respectively connected with the touch sense electrodes through a plurality of via holes.

Optionally, the common electrode layer further comprises common electrodes, and common electrode signals are loaded on the common electrodes during the display period.

Optionally, the array substrate further comprises common electrode signal lines, wherein the common electrode signal lines are connected respectively with the corresponding common electrodes, and the common electrode signal lines and the gate lines are provided in the same layer.

Optionally, the common electrode signal lines are respectively connected with the common electrodes through a plurality of via holes.

Optionally, the touch scan electrodes and the touch sense electrodes are formed into an interdigitated electrode array structure.

Optionally, the touch scan electrodes and the touch sense electrodes are formed into an interdigitated electrode array structure, and the common electrodes are respectively provided in the gaps between the touch scan electrodes and the touch sense electrodes.

Optionally, each row of touch scan electrodes include a plurality of touch scan sub-electrodes, two adjacent rows of touch scan electrodes form into a group, and two touch scan sub-electrodes which are in the two adjacent rows respectively and in opposite positions in each group are formed into an integrated structure, and the touch sense electrodes in adjacent groups are formed into an integrated structure.

Optionally, the common electrodes include first common sub-electrodes and second common sub-electrodes, wherein the touch scan electrodes and the touch sense electrodes are formed into an interdigitated electrode array structure, the first common sub-electrodes are respectively provided in the gaps between the touch scan electrodes and the touch sense electrodes, and the second common sub-electrodes are respectively provided in the gaps between the interdigitated electrode array structures in adjacent rows.

Optionally, every two adjacent rows of pixel units form into a group, wherein two gate lines are provided between the two rows of pixel units in each group, and one type of the touch scan signal lines and the touch sense signal lines or any combination of the touch scan signal lines and the touch sense signal lines are provided in the gaps between the adjacent groups.

Optionally, every two adjacent rows of pixel units form into a group, wherein two gate lines are provided between the two rows of pixel units in each group, and the touch scan signal lines, the touch sense signal lines and/or the common electrode signal lines are provided in the gaps between the adjacent groups.

The present invention also provides a touch screen comprising the above array substrate.

The present invention also provides a display apparatus comprising the above touch screen.

In addition, the present invention provides a manufacturing method of an array substrate, comprising: forming gate lines and data lines on a substrate base, wherein the gate lines and the data lines define pixel units; forming a common electrode layer on the substrate base, wherein the common electrode layer comprises touch scan electrodes and touch sense electrodes, common electrode signals are loaded on the touch scan electrodes during a display period and touch scan signals are loaded on the touch scan electrodes during a touch period, and common electrode signals are loaded on the touch sense electrodes during the display period and the touch sense electrodes output touch sense signals during the touch period.

Optionally, the common electrode layer further comprises common electrodes, wherein common electrode signals are loaded on the common electrodes during the display period.

Optionally, the manufacturing method further comprises: forming metal signal lines while forming the gate lines on the substrate base, wherein the metal signal lines include one type of the touch scan signal lines, the touch sense signal lines and the common electrode signal lines or any combination thereof.

In the technical solutions of the present invention, the common electrode layer comprises touch scan electrodes, touch sense electrodes and common electrodes, when the display signals and the touch signals are driven in time division, during a period of transferring the display signals, the touch scan electrodes, the touch sense electrodes and the common electrodes are together used for transferring the common electrode signals, and during a period of transferring the touch signals, the touch scan electrodes and the touch sense electrodes are used for transferring touch sense signals. As the touch scan electrodes and the touch sense electrodes are formed in the common electrode layer, there is no need to add a new film layer on the array substrate and add new process steps in the manufacturing process, thereby the manufacturing cost is reduced and the production efficiency is improved.

DETAILED DESCRIPTION OF THE PREFERRED EMBODIMENTS

In order to make the skilled persons in the art understand the technical solutions of the present invention best, the array substrate and the manufacturing method thereof, the touch screen and the display apparatus according to embodiments of the present invention will be described in detail in conjunction with the accompanying drawings.

Embodiment 1 of the present invention provides an array substrate, comprising: a substrate base; and gate lines, data lines and a common electrode layer formed on the substrate base, the gate lines and the data lines define pixel units, wherein the common electrode layer comprises touch scan electrodes and touch sense electrodes, and wherein common electrode signals are loaded on the touch scan electrodes during a display period and touch scan signals are loaded on the touch scan electrodes during a touch period, and common electrode signals are loaded on the touch sense electrodes during the display period and the touch sense electrodes output touch sense signals during the touch period.

In the present embodiment, the traditional common electrode layer with a whole connection surface is improved so that touch scan electrodes and touch sense electrodes are formed in the common electrode layer, and a technology for driving the display and the touch in time division is employed to achieve the function of the touch screen, wherein the technology for driving the display and the touch in time division means that: one frame time is divided into a display period and a touch period, wherein touch scan signals are loaded on the touch scan electrodes during the touch period, and touch sense signals are induced and outputted by the touch sense electrodes due to the couple with the touch scan electrodes during the touch period; common electrode signals are loaded on the touch scan electrodes and the touch sense electrodes during the display period, thereby the touch scan electrodes and the touch sense electrodes function as common electrodes. In the present embodiment, preferably, the material of the common electrode layer is a transparent conducting material, such as Tin Indium Oxide (ITO).

Figure 1:
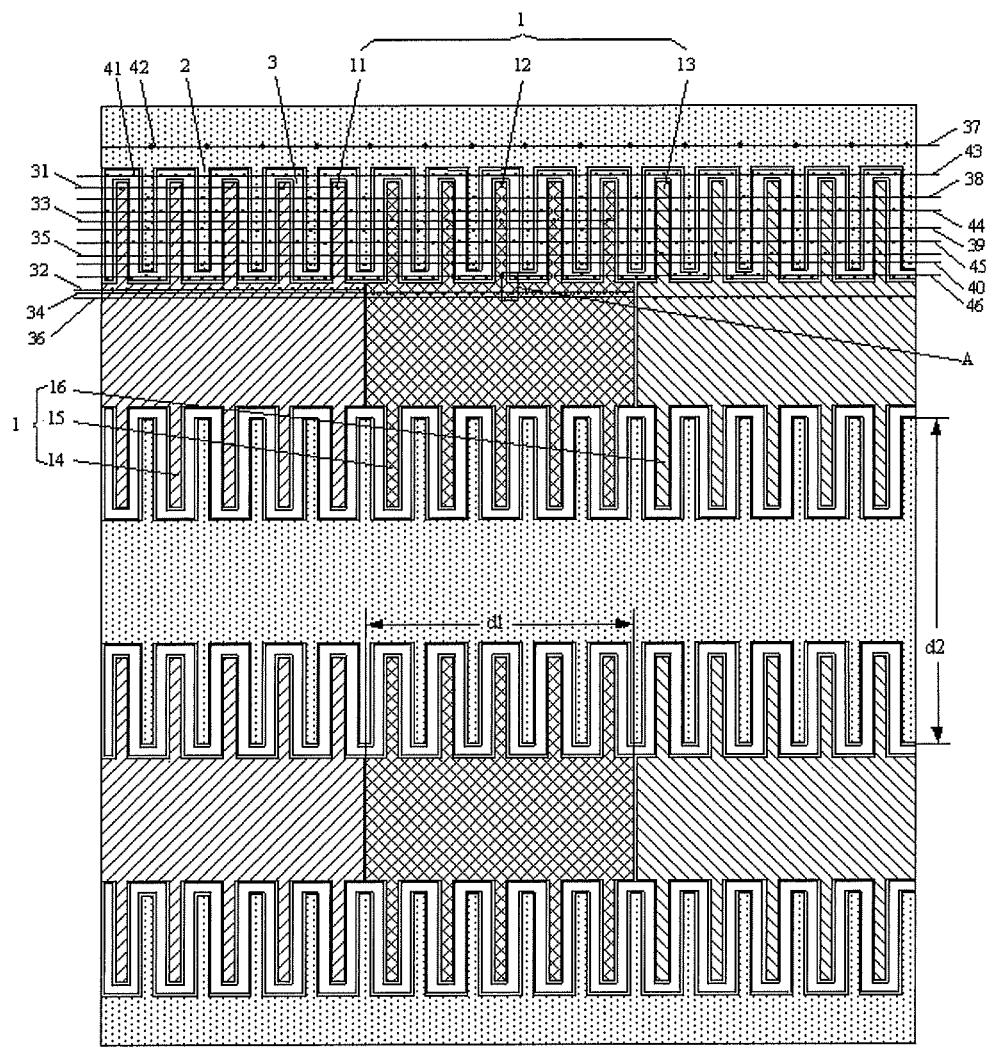
FIG. 1 is a structural schematic diagram of the common electrode layer according to embodiment 1 of the present invention.

FIG. 1 is a structural schematic diagram of the common electrode layer according to embodiment 1 of the present invention. As shown in FIG. 1, the common electrode layer comprises touch scan electrodes 1, touch sense electrodes 2 and common electrodes 3, wherein common electrode signals are loaded on the common electrodes 3 during the display period. In the present embodiment, the touch scan electrodes 1 and the touch sense electrodes 2 are formed into an interdigitated electrode array structure, and the touch scan electrodes 1 and the touch sense electrodes 2 are provided in the same layer and insulated with each other, thus there are gaps between the touch scan electrodes 1 and the touch sense electrodes 2, thereby the common electrodes 3 can be respectively provided in the gaps between the touch scan electrodes 1 and the touch sense electrodes 2. Preferably, each row of the touch scan electrodes 1 include a plurality of touch scan sub-electrodes, and every two adjacent rows of the touch scan electrodes 1 are formed into a group, wherein every two touch scan sub-electrodes which are in the two adjacent rows respectively and in opposite positions in each group are formed into an integrated structure, and the touch sense electrodes 2 in adjacent groups are formed into an integrated structure. With the first (the top row in the figure) and second rows in FIG. 1 as an example, each of the touch scan electrodes 1 in the first row includes a touch scan sub-electrode 11, a touch scan sub-electrode 12 and a touch scan sub-electrode 13, wherein the touch scan sub-electrode 11, the touch scan sub-electrode 12 and the touch scan sub-electrode 13 are provided in the same layer and insulated with each other. Each of the touch scan electrodes 1 in the second row include a touch scan sub-electrode 14, a touch scan sub-electrode 15 and a touch scan sub-electrode 16, wherein the touch scan sub-electrode 14, the touch scan sub-electrode 15 and the touch scan sub-electrode 16 are provided in the same layer and insulated with each other. The first and second rows of the touch scan electrodes 1 are formed into a group, wherein a touch scan sub-electrode 11 and a touch scan sub-electrode 14 in the opposite positions are formed into an integrated structure, a touch scan sub-electrode 12 and a touch scan sub-electrode 15 in opposite positions are formed into an integrated structure, and a touch scan sub-electrode 13 and a touch scan sub-electrode 16 are formed into an integrated structure. Moreover, the touch sense electrodes 2 in adjacent groups are formed into an integrated structure, as shown in FIG. 1, for example, the touch sense electrodes 2 formed into an interdigitated structure with the touch scan electrodes in the second row and the touch sense electrodes 2 formed into an interdigitated structure with the touch scan electrodes in the third row are formed into an integrated structure. Specially, as shown in FIG. 1, the common electrodes 3 can be respectively provided in the gaps between the touch scan sub-electrodes and the touch sense electrodes 2.

In the present embodiment, the touch scan electrodes are longitudinal electrodes and the touch sense electrodes are lateral electrodes. Alternatively, the touch scan electrodes may be lateral electrodes and the touch sense electrodes may be longitudinal electrodes, which will not be concretely shown in figures. In addition, in practical applications, the touch scan electrodes and the touch sense electrodes may be other structures, such as strip structure or diamond structure, which is not limited here. In the present embodiment, the touch scan electrodes and the touch sense electrodes are formed into an interdigitated electrode array structure, thus the induction capacitances between the touch scan electrodes and the touch sense electrodes are increased, thereby the sensitivity and accuracy of touch are improved. Further, the space between the common electrodes and the interdigitated electrode array structure can be adjusted to further increasing the induction capacitances between the touch scan electrodes and the touch sense electrodes, thereby the sensitivity and accuracy of touch is further improved.

In the present embodiment, the precision of the touch screen is usually of the order of millimeter, and the density and the width of the touch scan electrode and the touch sense electrode can be selected to ensure the required precision. For example, as shown in FIG. 1, the width d1 of the touch scan electrode may be 5 mm to 6 mm, and the width d2 of the touch sense electrode may be 5 mm to 6 mm.

Further, the array substrate may comprise touch scan signal lines, touch sense signal lines and common electrode signal lines. The touch scan signal lines are used for outputting common electrode signals to the touch scan electrodes during the display period and outputting touch scan signals to the touch scan electrodes during the touch period. The touch sense signal lines are used for outputting common electrode signals to the touch sense electrodes during the display period and receiving the touch sense signals outputted from the touch sense electrodes to output during the touch period. The common electrode signal lines are used for outputting common electrode signals to the common electrodes during the display period. The touch scan signal lines are respectively connected with the corresponding touch scan electrodes, the touch sense signal lines are respectively connected with the corresponding touch sense electrodes, and the common electrode signal lines are respectively connected with the corresponding common electrodes. Preferably, each touch scan sub-electrode may correspond to at least one touch scan signal line, thus each touch scan sub-electrode may be connected with at least one touch scan signal line. As shown in FIG. 1, for example, the touch scan sub-electrode 11 is connected with the corresponding touch scan signal lines 31 and 32, the touch scan sub-electrode 12 is connected with the corresponding touch scan signal lines 33 and 34, and the touch scan sub-electrode 13 is connected with the corresponding touch scan signal lines 35 and 36. Preferably, each touch sense electrode may correspond to at least one touch sense signal line, thus each touch sense electrode may be connected with at least one touch sense signal line. As shown in FIG. 1, for example, the touch sense electrode 2 is connected with the corresponding touch sense signal lines 37, 38, 39 and 40. Preferably, the touch scan signal lines may be respectively connected with the corresponding touch scan electrodes through a plurality of via holes 41, and the touch sense signal lines may be respectively connected with the corresponding touch sense electrodes through a plurality of via holes 42. Should be noted that, the solid dots in FIG. 1 represent the via holes, and only the signs of 41 and 42 are indicated in the figure, the rest via holes are not labeled with signs. Preferably, each common electrode may correspond to at least one common electrode signal lines, thus each common electrode may be connected with at least one common electrode signal lines. As shown in FIG. 1, for example, the common electrode 3 is connected with the common electrode signal lines 43, 44, 45 and 46. Preferably, the common electrode signal lines are respectively connected with the corresponding common electrodes through a plurality of via holes. As the common electrode layer is usually made of transparent conducting material, thus the fact that the touch scan signal lines are respectively connected with the corresponding touch scan electrodes through a plurality of via holes, the touch sense signal lines are respectively connected with the corresponding touch sense electrodes through a plurality of via holes, and the common electrode signal lines are respectively connected with the corresponding common electrodes through a plurality of via holes equivalents to that the electrodes made of transparent conducting material and the metal resistors formed by the signal lines are connected in parallel, which can minimize the resistance of the electrodes as much as possible, thereby the signal-noise ratio of the signals transferred by the electrodes can be improved.

In the present embodiment, preferably, all of the touch scan signal lines, the touch sense signal lines and the common electrode signal lines are provided in the same layer with the gate lines. In practical applications, optionally, the touch scan signal lines, the touch sense signal lines and the common electrode signal lines may be provided in a layer different from the layer which the gate lines are located in, that is, an insulation layer may be provided between the touch scan signal lines, the touch sense signal lines and the common electrode signal lines and the gate lines. In practical applications, optionally, the touch scan signal lines, the touch sense signal lines and the common electrode signal lines may be provided in the same layer with the data lines. When the touch scan signal lines, the touch sense signal lines and the common electrode signal lines are provided in the same layer with the gate lines, the touch scan signal lines, the touch sense signal lines, the common electrode signal lines and the gate lines may be formed simultaneously by using only one mask plate without any additional mask plate, thus the production process is simplified, thereby the manufacturing cost is reduced and the production efficiency is improved. Based on the same reasons, when the touch scan signal lines, the touch sense signal lines and the common electrode signal lines are provided in the same layer with the data lines, the production process is also simplified, thus the manufacturing cost is reduced and the production efficiency is improved.

Figure 2:
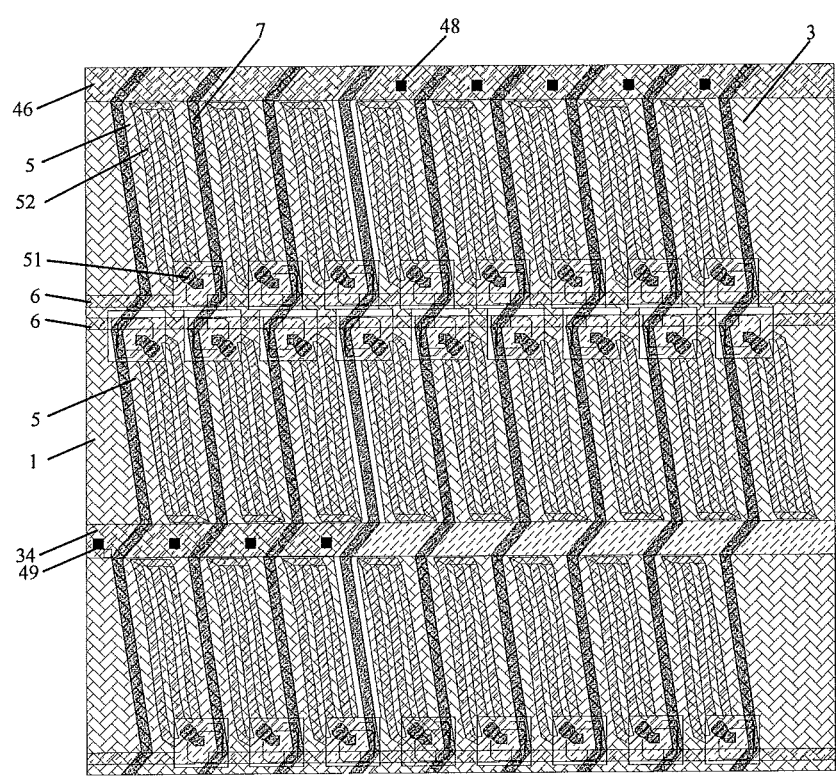
FIG. 2 is an amplified schematic diagram of portion A in FIG. 1.

In the present embodiment, a pixel unit may comprise a thin film transistor (TFT) and a pixel electrode. Preferably, the array substrate of the present embodiment may be applied to Advanced Super Dimension Switch (ADS) display apparatus or High Advanced Super Dimension Switch (HADS) display apparatus. In a touch screen, the precision of the structure with touch function is usually of the order of millimeter, and the precision of the structure with display function is usually of the order of micrometer. Thus, one touch scan electrode and one touch sense electrode usually cover a plurality of rows or columns of the pixel units. The precision refers to the dimension of a touch unit or the dimension of a pixel unit. In the present embodiment, as the structure with touch function and the structure with display function are of different orders of precisions, in order to more clearly show the structure of the pixel unit, FIG. 2 is obtained by amplifying a local structure of FIG. 1. FIG. 2 is an amplified schematic diagram of portion A in FIG. 1. As shown in FIG. 2, gate lines 6 and data lines 7 define pixel units 5, wherein a pixel unit 5 comprises a thin film transistor 51 and a pixel electrode 52, the pixel units 5 in two adjacent rows are formed into a group, and two gate lines 6 are provided between the two rows of the pixel units 5 in each group. The two gate lines 6 are used for controlling the two rows of the pixel units 5 above and below the two gate lines 6 respectively, wherein the gate line 6 close to the above row of the pixel units 5 is used for controlling the above row of the pixel units 5, and the gate line 6 close to the below row of the pixel units 5 is used for controlling the below row of the pixel units 5. With the above configuration, the positions of a portion of the gate lines are saved, thus one type of the touch scan signal lines, touch sense signal lines and the common electrode signal lines or any combination thereof may be provided in the gaps between the adjacent groups, that is, one type of the touch scan signal lines, touch sense signal lines and the common electrode signal lines or any combination thereof may be located in the gaps between the adjacent groups. Moreover, the touch scan signal lines, the touch sense signal lines and the common electrode signal lines may be provided in the same layer with the gate lines 6. Specifically, as shown in FIG. 2, a the common electrode signal line 46 is provided above the upper row of the pixel units 5 and connected with a common electrode 3 through the via holes 48, and a touch scan signal line 34 is provided below the lower row of the pixel units 5 and connected with a touch scan electrode 1 through the via holes 49. As above, one or more signal lines may be provided in the gap between two adjacent groups. The positions of a portion of the gate lines are saved by the above configuration so as to arrange the touch scan signal lines, the touch sense signal lines and the common electrode signal lines, thereby no more open regions will be occupied, and the open ratio of the pixel of the touch screen is maximized.

The common electrode layer in the array substrate of the present embodiment comprises touch scan electrodes, touch sense electrodes and the common electrodes. The display signals and the touch signals are driven in time division, so that during the period of transferring the display signals, the touch scan electrodes, the touch sense electrodes and the common electrodes together are used for transferring the common signals, and during the period of transferring the touch signals, the touch scan electrodes and the touch sense electrodes are used for transferring the touch sense signals. In the present embodiment, as the touch scan electrodes and the touch sense electrodes are formed in the common electrode layer, there is no need to add a new film layer on the array substrate or add new process steps in the manufacturing process, thereby the manufacturing cost is reduced and the production efficiency is improved. In the present embodiment, in fully considering the induction capacitance between the touch scan electrodes and the touch sense electrodes, the touch scan electrodes and the touch sense electrodes are formed in the common electrode layer, which reduces the capacitances to earth of the touch scan electrodes and the capacitances to earth of the touch sense electrodes, moreover, the display signals and the touch signals are driven in time division so that the RC delay of the touch screen is reduced, the noise is reduced and the signal-noise ratio (SNR) of the touch screen is increased. As the display signals and the touch signals are driven in time division so that the interference between the touch function and the display function is reduced, thus the quality of the pictures displayed on the touch screen and the accuracy for touching are improved.

Embodiment 2 of the present invention provides an array substrate comprising: a substrate base; and gate lines, data lines and a common electrode layer formed on the substrate base, wherein the gate lines and the data lines define pixel units, and the common electrode layer comprises touch scan electrodes and touch sense electrodes, wherein common electrode signals are loaded on the touch scan electrodes during a display period and touch scan signals are loaded on the touch scan electrodes during a touch period, and common electrode signals are loaded on the touch sense electrodes during the display period and the touch sense electrodes output touch sense signals during the touch period.

Figure 3:
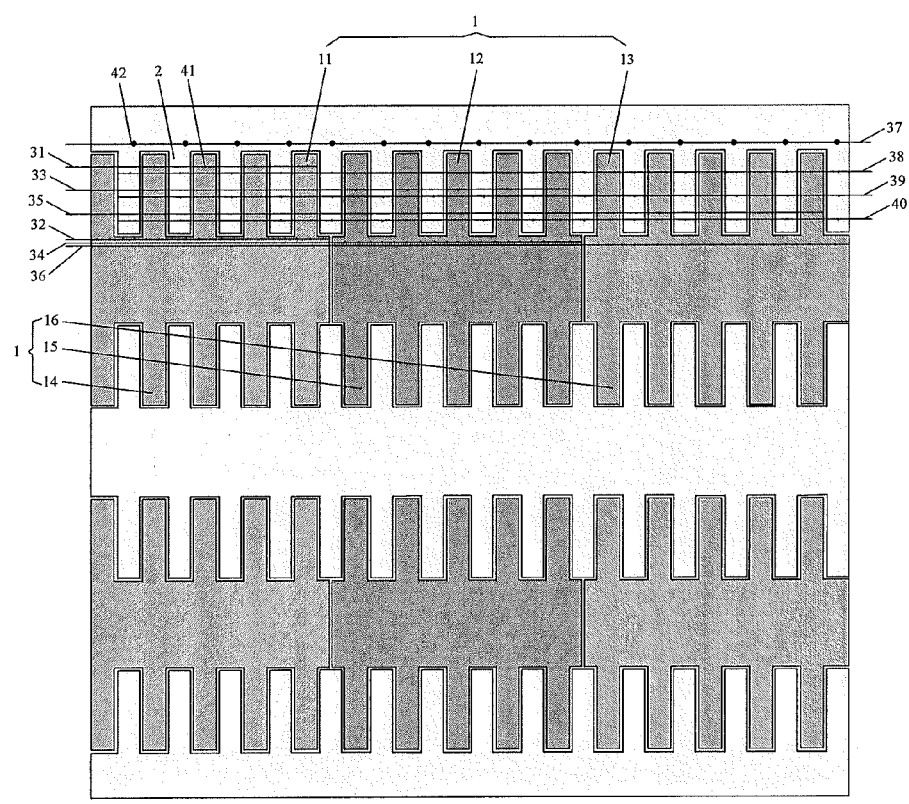
FIG. 3 is a structural schematic diagram of the common electrode layer according to embodiment 2 of the present invention.

FIG. 3 is a structural schematic diagram of the common electrode layer according to embodiment 2 of the present invention. As shown in FIG. 3, the common electrode layer comprises touch scan electrodes 1 and the touch sense electrodes 2. In the present invention, the touch scan electrodes 1 and the touch sense electrodes 2 are formed into an interdigitated electrode array structure, and the touch scan electrodes 1 and the touch sense electrodes 2 are formed in the same layer and insulated with each other. Preferably, each row of the touch scan electrodes 1 may include a plurality of touch scan sub-electrodes, and every two adjacent rows of the touch scan electrodes are formed into a group, wherein the two touch scan sub-electrodes which are in the two adjacent lows and in opposite positions in a group are formed into an integrated structure, and the touch sense electrodes 2 in adjacent groups are formed into an integrated structure. The specific descriptions of the touch scan electrodes 1 and touch sense electrodes 2 are the same as those of the embodiment 1, which will not be restated here.

Further, the array substrate may comprises touch scan signal lines and touch sense signal lines. The specific descriptions of the touch scan signal lines and touch sense signal lines are the same as those of the embodiment 1 for, which will not be restated here.

In the present embodiment, preferably, the touch scan signal lines and the touch sense signal lines are provided in the same layer with the gate lines. In practical applications, alternatively, the touch scan signal lines and the touch sense signal lines may be provided in layer different from the layer which the gate lines are located in, and an insulation layer may be provided between the touch scan signal lines and the touch senses lines and the gate lines. In practical applications, optionally, the touch scan signal lines and the touch sense signal lines may be provided in the same layer with the data lines.

In the present embodiment, the touch scan signal lines and/or the touch sense signal lines for every two adjacent rows are provided in the gaps between adjacent groups. The specific descriptions thereof are the same as those of the embedment 1, which will not be restated here.

The distinctness of the present embodiment from the embodiment 1 is that: in the present embodiment, the common electrode layer does not comprise common electrodes. Specifically, there is no common electrode in the gaps between the touch scan sub-electrodes and the touch sense electrodes. As there is no common electrodes in the common electrode layer, thus during the display period, common electrode signals are loaded on the touch scan electrodes and the touch sense electrodes, so that the touch scan electrodes and the touch sense electrodes function as common electrodes. Compared to the embodiment 1, in the present embodiment, as there is no common electrode in the common electrode layer, thereby the complexity of the pattern of the common electrode layer is simplified and the difficulty of manufacturing is reduced.

Embodiment 3 of the present invention provides an array substrate comprising: a substrate base; and gate lines, data lines and a common electrode layer formed on the substrate base, wherein the gate lines and the data lines define pixel units, and the common electrode layer comprises touch scan electrodes and touch sense electrodes, wherein common electrode signals are loaded on the touch scan electrodes during the display period and touch scan signals are loaded on the touch scan electrodes during the touch period, and common electrode signals are loaded on the touch sense electrodes during the display period and the touch sense electrodes output the touch sense signals during the touch period.

Figures 4, 5:
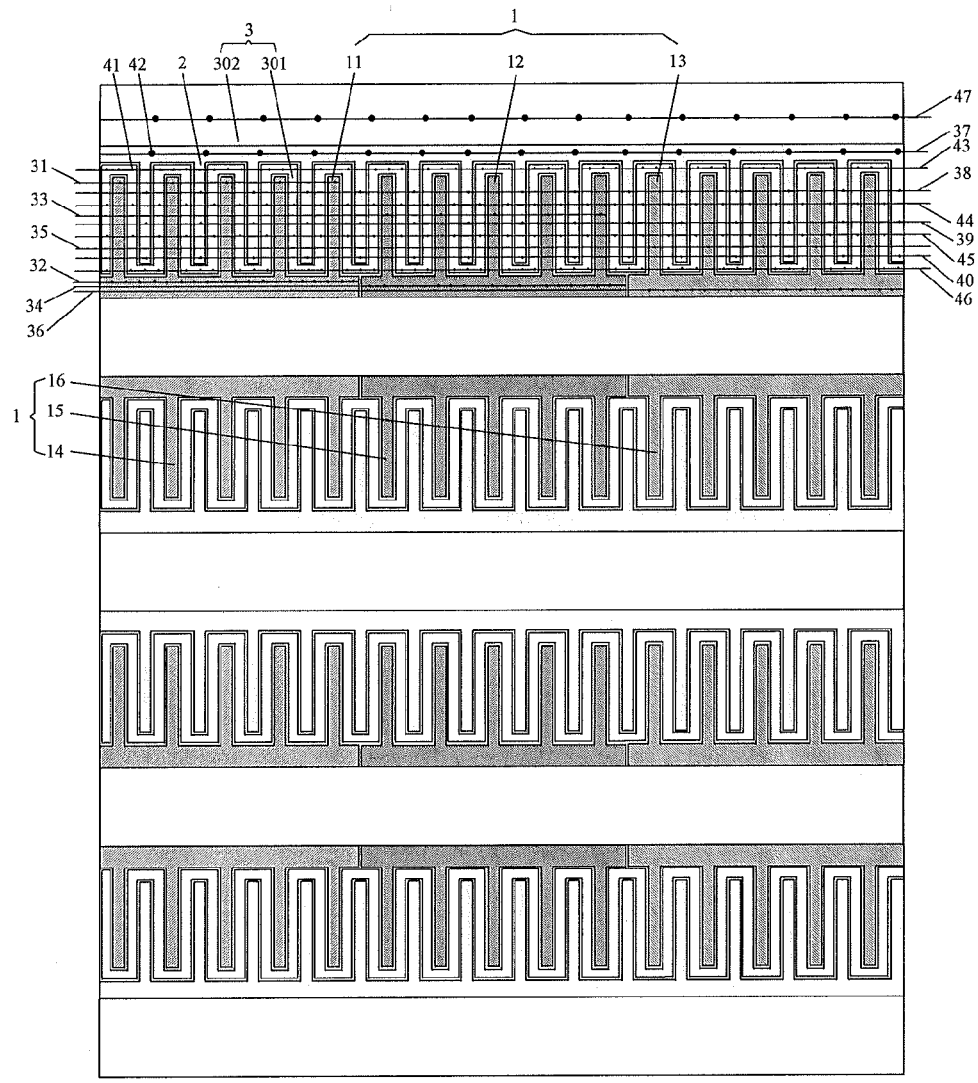
FIG. 4 is a structural schematic diagram of the common electrode layer according to embodiment 3 of the present invention.
FIG. 5 is a flow chart of the manufacturing method of an array substrate according to embodiment 6 of the present invention.

FIG. 4 is a structural schematic diagram of the common electrode layer according to embodiment 3 of the present invention. As shown in FIG. 4, the common electrode layer comprises touch scan electrodes 1, touch sense electrodes 2 and common electrodes 3, wherein common electrode signals are loaded on the common electrodes 3 during the display period. In the present embodiment, the touch scan electrodes 1 and the touch sense electrodes 2 are formed into an interdigitated electrode array structure, and the touch scan electrodes 1 and the touch sense electrodes 2 are formed in the same layer and insulated with each other. The common electrodes 3 may include first common sub-electrodes 301 and second common sub-electrodes 302, wherein the first common sub-electrodes 301 are respectively provided in the gaps between the touch scan electrodes and the touch sense electrodes, and the second common sub-electrodes 302 are respectively provided in the gaps between adjacent rows of the interdigitated electrode array structures. In the present embodiment, preferably, each row of the touch scan electrodes 1 may include a plurality of touch scan sub-electrodes. As shown in FIG. 4, the first row (the top row in the figure) of the touch scan electrodes 1 includes a touch scan sub-electrode 11, a touch scan sub-electrode 12 and a touch scan sub-electrode 13, the first common sub-electrodes 301 may be respectively provided in the gaps between the touch scan sub-electrodes and the touch sense electrodes 2.

Further, the array substrate may comprises touch scan signal lines, touch sense signal lines and common signal lines. In the present embodiment, preferably, the touch scan signal lines, the touch sense signal lines and the common electrode signal lines are provided in the same layer with the gate lines. The specific descriptions of the touch scan signal lines, the touch sense signal lines and the common signal lines are the same as those of the embodiment 1, which will not be restated here. As shown in FIG. 4, the distinctness of the present embodiment from the embodiment 1 is that: in the present embodiment, a common electrode 3 includes a first common sub-electrodes 301 and a second common sub-electrode 302, wherein the first common sub-electrode 301 is connected with the corresponding common electrode signal lines 43, 44, 45 and 46, and the second common sub-electrode 302 is connected with a corresponding common electrode signal line 47. Preferably, the common electrode signal lines may be connected with the corresponding common electrodes through a plurality of via holes.

Should be noted that: in FIGS. 1, 3 and 4, as an example, signal lines are only shown at the corresponding positions in the first row of the interdigitated electrode array structure and are not shown for the other rows. However, the skilled persons in the art should understand that, in practical applications, there are also signal lines at the corresponding positions in other rows of the interdigitated electrode array structure.

Embodiment 4 of the present invention provides a touch screen comprising the array substrate of the embodiment 1, the embodiment 2 or the embodiment 3, which will not be restated here.

Embodiment 5 of the present invention provides a display apparatus comprising the touch screen of the embodiment 4, which will not be restated here.

FIG. 5 is a flow chart of the manufacturing method of an array substrate according to embodiment 6 of the present invention. As shown in FIG. 5, the method comprises following steps.

Step 101, forming gate lines and data lines on a substrate base, wherein the gate lines and the data lines define pixel units.

In the present embodiment, a pixel unit comprises a thin film transistor TFT and a pixel electrode, wherein a TFT comprises a gate electrode, a source electrode, a drain electrode and an active layer.

Optionally, the step 101 comprises following sub-steps.

Sub-step 1011, forming gate electrodes and gate lines on a substrate base, and forming metal signal lines while forming the gate lines, wherein the metal signal lines include one type of the touch scan signal lines, the touch sense signal lines and the common electrode signal lines or any combination thereof.

Sub-step 1012, forming a gate insulation layer on the gate electrodes, the gate lines and the metal signal lines, wherein the gate insulation layer covers the whole substrate base.

Sub-step 1013, forming patterns of the active layers on the gate insulation layer.

Sub-step 1014, forming the source electrodes, the drain electrodes and the data lines connected with the source electrodes on the substrate base formed with the patterns of the active layers thereon, wherein the gate lines and the data lines define pixel units.

Sub-step 1015, forming the pixel electrodes connected with the drain electrodes in the pixel units.

Sub-step 1016, forming a passivation layer on the substrate base formed with the pixel electrodes thereon, and forming via holes in the passivation layer.

Step 102, forming a common electrode layer on the substrate base formed with the passivation layer thereon, and the common electrode layer comprises touch scan electrodes and touch sense electrodes, wherein common electrode signals are loaded on the touch scan electrodes during the display period and touch scan signals are loaded on the touch scan electrodes during the touch period, and common electrode signals are loaded on the touch sense electrodes during the display period and the touch sense electrodes output touch sense signals during the touch period.

Optionally, the common electrode layer further comprises common electrodes, wherein common electrode signals are loaded on the common electrodes during the display period.

The common electrode layer is formed on the passivation layer and filled in the via holes, so that the touch scan signal lines are respectively connected with the corresponding touch scan electrodes through the via holes, the touch sense signal lines are connected with the corresponding touch sense electrodes through the via holes, and the common electrode signal lines are respectively connected with the corresponding common electrodes through the via holes.

In the present embodiment, the gate electrodes, the gate lines, the metal signal lines, the patterns of the active layers, the source electrodes, the drain electrodes, the data lines, the touch scan electrodes, the touch sense electrodes and the common electrodes may be formed by patterning. Optionally, the patterning at least includes steps: applying photoresist, mask exposure, developing, etching and stripping photoresist and so on.

The manufacturing method of the present embodiment may be used for manufacturing the array substrate of the embodiment 1, the embodiment 2 or the embodiment 3. The descriptions of the array substrate can be seen from the above embodiments, which will not be restated here.

The array substrate manufactured by the method of the present embodiment comprises touch scan electrodes, touch sense electrodes and the common electrodes. The display signals and the touch signals are driven in time division, so that during the period of transferring the display signals, the touch scan electrodes, the touch sense electrodes and the common electrodes together are used for transferring the common signals, and during the period of transferring the touch signals, the touch scan electrodes and the touch sense electrodes are used for transferring the touch sense signals. In the present embodiment, as the touch scan electrodes and the touch sense electrodes are formed in the common electrode layer, there is no need to add a new film layer on the array substrate or add new process steps in the manufacturing process, thereby the manufacturing cost is reduced and the production efficiency is improved. When the touch scan signal lines, the touch sense signal lines and the common electrode signal lines are provided in the same layer with the gate lines, the touch scan signal lines, the touch sense signal lines, the common electrode signal lines and the gate lines may be formed simultaneously by using one mask plate without any additional mask plate, thus the production process is simplified, thereby the manufacturing cost is reduced and the production efficiency is improved.

It should be understood that, the above implementations are only used to explain the principle of the present invention, but not to limit the present invention, the person skilled in the art can make various variations and modifications without departing from the spirit and scope of the present invention, therefore, all equivalent technical solutions fall within the scope of the present invention, and the protection scope of the present invention should be defined by the claims.

The invention claimed is:

1. An array substrate, comprising: a substrate base; and gate lines, data lines and a common electrode layer formed on the substrate base, the gate lines and the data lines define pixel units,
   wherein the common electrode layer comprises touch scan electrodes and touch sense electrodes, wherein each of the touch scan electrodes and the touch sense electrodes comprises a plurality of electrode strips which are connected at one end, the electrode strips of the touch scan electrode and the electrode strips of the touch sense electrode being arranged alternatively to form into an interdigitated electrode array structure,
   wherein the common electrode layer further comprises common electrodes, and common electrode signals are loaded on the common electrodes during the display period,
   wherein the common electrodes are respectively provided in the gaps between the touch scan electrodes and the touch sense electrodes, and
   wherein common electrode signals are loaded on the touch scan electrodes during a display period and touch scan signals are loaded on the touch scan electrodes during a touch period, and common electrode signals are loaded on the touch sense electrodes during the display period and the touch sense electrodes output touch sense signals during the touch period.

2. The array substrate of claim 1, further comprises touch scan signal lines and touch sense signal lines, wherein the touch scan signal lines are connected with the corresponding touch scan electrodes respectively, the touch sense signal lines are connected with the corresponding touch sense electrodes respectively, and the touch scan signal lines and the touch sense signal lines are provided in the same layer with the gate lines.

3. The array substrate of claim 2, wherein the touch scan signal lines are respectively connected with the touch scan electrodes through a plurality of via holes, and the touch sense signal lines are respectively connected with the touch sense electrodes through a plurality of via holes.

4. The array substrate of claim 1, further comprises common electrode signal lines, wherein the common electrode signal lines are respectively connected with the corresponding common electrodes, and the common electrode signal lines and the gate lines are provided in the same layer.

5. The array substrate of claim 4, wherein the common electrode signal lines are respectively connected with the common electrodes through a plurality of via holes.

6. The array substrate of claim 1, wherein each row of touch scan electrodes include a plurality of touch scan sub-electrodes, two adjacent rows of touch scan electrodes form into a group, and two touch scan sub-electrodes which are in the two adjacent rows respectively and in opposite positions in each group are formed into an integrated structure, and the touch sense electrodes in adjacent groups are formed into an integrated structure.

7. The array substrate of claim 1, wherein the common electrodes include first common sub-electrodes and second common sub-electrodes, wherein the first common sub-electrodes are respectively provided in the gaps between the touch scan electrodes and the touch sense electrodes, and the second common sub-electrodes are respectively provided in the gaps between the interdigitated electrode array structures in adjacent rows.

8. The array substrate of claim 2, wherein every two adjacent rows of pixel units form into a group, wherein two gate lines are provided between the two rows of pixel units in each group, and the touch scan signal lines and/or the touch sense signal lines are provided in the gaps between the adjacent groups.

9. The array substrate of claim 4, wherein every two adjacent rows of pixel units forms into a group, wherein two gate lines are provided between the two rows of pixel units in each group, and one type of the touch scan signal lines, the touch sense signal lines and the common electrode signal lines or any combination of the touch scan signal lines, the touch sense signal lines and the common electrode signal lines are provided in the gaps between the adjacent groups.

10. A touch screen comprising the array substrate of claim 1.

11. A display apparatus comprising the touch screen of claim 10.

12. A manufacturing method of an array substrate, comprising:

forming gate lines and data lines on a substrate base, wherein the gate lines and the data lines define pixel units;

forming a common electrode layer on the substrate base, wherein the common electrode layer comprises touch scan electrodes and touch sense electrodes, wherein each of the touch scan electrodes and the touch sense electrodes comprises a plurality of electrode strips which are connected at one end, the electrode strips of the touch scan electrode and the electrode strips of the touch sense electrode being arranged alternatively to form into an interdigitated electrode array structure, wherein the common electrode layer further comprises common electrodes, and common electrode signals are loaded on the common electrodes during the display period, wherein the common electrodes are respectively provided in the gaps between the touch scan electrodes and the touch sense electrodes, and wherein common electrode signals are loaded on the touch scan electrodes during a display period and touch scan signals are loaded on the touch scan electrodes during a touch period, and common electrode signals are loaded on the touch sense electrodes during the display period and the touch sense electrodes output touch sense signals during the touch period.

13. The manufacturing method of an array substrate of claim 12, further comprises:

forming metal signal lines while forming the gate lines on the substrate base, wherein the metal signal lines include one type of the touch scan signal lines, the touch sense signal lines and the common electrode signal lines or any combination thereof.

14. The array substrate of claim 1, wherein each row of touch scan electrodes include a plurality of touch scan sub-electrodes, two adjacent rows of touch scan electrodes form into a group, and two touch scan sub-electrodes which are in the two adjacent rows respectively and in opposite positions in each group are formed into an integrated structure, and the touch sense electrodes in adjacent groups are formed into an integrated structure.

* * * * *